(12) United States Patent  (10) Patent No.: US 9,152,919 B2
Dasgupta et al.  (45) Date of Patent: Oct. 6, 2015

(54) METHOD AND SYSTEM FOR RECOMMENDING TASKS TO CROWDWORKER

(71) Applicant: Xerox Corporation, Norwalk, CT (US)

(72) Inventors: Koustuv Dasgupta, Bangalore (IN); Chithralekha Balamurugan, Pondicherry (IN); Laura E Celis, Bangalore (IN); Karanam Saraschandra, Karnataka (IN)

(73) Assignee: Xerox Corporation, Norwalk, CT (US)

( * ) Notice: Subject to any disclaimer, the term of this patent is extended or adjusted under 35 U.S.C. 154(b) by 303 days.

(21) Appl. No.: 13/766,832

(22) Filed: Feb. 14, 2013

(65) Prior Publication Data

US 2014/0229413 A1 Aug. 14, 2014

(51) Int. Cl.
*G06N 99/00* (2010.01)
*G06N 5/02* (2006.01)

(52) U.S. Cl.
CPC . *G06N 5/02* (2013.01); *G06N 99/00* (2013.01)

(58) Field of Classification Search
CPC ................................. G06Q 10/04; G06N 9/00
See application file for complete search history.

(56) References Cited

U.S. PATENT DOCUMENTS

| 2011/0313801 | A1 | 12/2011 | Bieward et al. | |
| 2013/0029769 | A1* | 1/2013 | Lee ................................. | 463/42 |

OTHER PUBLICATIONS

P. Minder et al. "CrowdManager—Combinatorial Allocation and Pricing of Crowdsourcing Tasks with Time Constraints", Workshop on Social Computing and User Generated Content, Jun. 7, 2012, Valencia, Spain, 18 pages.*

CJ Ho and J. Vaughan, "Online Task Assignment in Crowdsourcing Markets", Proc. 26th AAAI Conf. on Artificial Intelligence, 2012, pp. 45-51.*
"AdWords and Generalized On-line Matching", Aranyak Mehta, et al, ACM Transactions on Computational Logic, vol. V, No. N, Aug. 2007, pp. 1-20.
"An Optimal Algorithm for On-line Bipartite Matching", Richard M. Karp et al, 1990 ACM 089791-361-2/90/0005/0352, pp. 352-358.
"Online Stochastic Matching: Beating 1 1/e", Jon Feldman et al, May 26, 2009, pp. 1-15.
"Crowd Census" by Daily Crowdsource, Q3, 2011, David Bratvold, pp. 1-8.
Amazon Mechanical Turk, API Reference, API Version Mar. 25, 2012.
"The Adwords Problem: Online Keyword Matching with Budgeted Bidders under Random Permutations" Nikhil R. Devanur, pp. 1-8, 2009.
"Towards Task Recommendation in Micro-Task Markets", Vamshi Ambati et al, pp. 80-83, 2011.

* cited by examiner

*Primary Examiner* — Kakali Chaki
*Assistant Examiner* — Vincent Gonzales

(57) ABSTRACT

A method and system for recommending one or more tasks from a plurality of crowdsourcing tasks to a crowdworker is disclosed. The method includes identifying one or more categories for the plurality of tasks on the plurality of crowdsourcing platforms. In response to the identifying, determining, at a login time, values of one or more utility parameters of the crowdworker corresponding to the one or more categories. After identifying, the method selects the one or more tasks from the plurality of tasks by choosing one or more constraints on the determined values of the one or more utility parameters of the crowdworker. The method then recommends to the crowdworker at the login time, the one or more tasks associated with the crowdworker based on selected one or more tasks.

19 Claims, 7 Drawing Sheets

FIG. 4

Please provide your valuable feedback on the following:

The task was easy to understand.
☐ Strongly Disagree ☐ Somewhat Disagree ☐ Can't Say ☐ Somewhat Agree ☐ Strongly Agree

The task had enough information to complete.
☐ Strongly Disagree ☐ Somewhat Disagree ☐ Can't Say ☐ Somewhat Agree ☐ Strongly Agree

The task was fairly priced.
☐ Strongly Disagree ☐ Somewhat Disagree ☐ Can't Say ☐ Somewhat Agree ☐ Strongly Agree

The task recommendation was suitable.
☐ Strongly Disagree ☐ Somewhat Disagree ☐ Can't Say ☐ Somewhat Agree ☐ Strongly Agree

METHOD AND SYSTEM FOR RECOMMENDING TASKS TO CROWDWORKER

TECHNICAL FIELD

The presently disclosed embodiments are related to crowdsourcing. More particularly, the presently disclosed embodiments are related to a method and system for recommending tasks to a crowdworker.

BACKGROUND

In an environment in which business tasks are to be outsourced or crowdsourced, its necessary to find a crowdsourcing platform that is attractive for crowdworkers. With the mushrooming of crowdsourcing platforms and overwhelming growth in number of task postings on various crowdsourcing platforms, crowdworkers face a real challenge finding which tasks are more suited to the changing and dynamic environment. Some enhanced crowdsourcing platforms give the crowdworkers an option to rank tasks by "most recent", or "most HITs (Human Intelligence Task) available". Some also post some extra HITs within the task, repost it, or repost with added payments to make the task more suited to the crowdworkers. Some other crowdsourcing platforms attempt to circumvent these problems by pushing tasks to a pool of "dedicated" crowdworkers who have a contractual binding to solve a certain number of tasks everyday within the crowdworker's area of expertise.

As a result the crowdsourced tasks may also not be very relevant and useful for the crowdworkers who view these tasks. For the crowdworker, the state of the art technology solutions may not suffice in more than one scenario. It is possible that many of the tasks posted on the crowdsourcing platforms may take longer times to complete or never getting complete. Also, these approaches may limit the needs of crowdworkers with a primary job, and looking at crowdsourcing platforms for an engaging experience that may provide secondary income. It is also necessary to factor in the changing and dynamic business needs associated with the crowdsourced tasks.

The end result is a solution where crowdworkers are unproductive or disinterested, while requesters are left struggling to find crowdworkers for completing their tasks on time. In order to provide the most suited tasks to the crowdworker it is therefore necessary to create an ecosystem that attracts crowdworkers towards an engaging business model with the crowdsourcing platforms.

SUMMARY

According to embodiments illustrated herein, there is provided a computer-implemented method for recommending one or more tasks to a crowdworker, the one or more tasks is selected from a plurality of tasks offered by a plurality of crowdsourcing platforms. The computer-implemented method includes identifying one or more categories associated with the plurality of tasks offered by the plurality of crowdsourcing platforms. In response to the identifying, determine at a login time, values of one or more utility parameters of the crowdworker corresponding to the one or more categories. In addition, the computer-implemented method includes selecting the one or more tasks from the plurality of tasks by choosing one or more constraints on the determined values of the one or more utility parameters of the crowdworker. Furthermore, the computer-implemented method includes recommending, at the login time to the crowdworker, the one or more tasks associated with the crowdworker based on selecting.

According to embodiments illustrated herein, there is provided a system for recommending one or more tasks to a crowdworker, the one or more tasks is selected from a plurality of tasks offered by a plurality of crowdsourcing platforms. The system includes a utility module, a task personalization module, a presentation module, and a feedback module. The utility module is configured for determining preferences of a crowdworker at a login time based on values of one or more utility parameters of the crowdworker on the plurality of tasks, and determining one or more requester tasks based on values of one or more utility parameters of the plurality of requesters at the login time. The task personalization module is configured for selecting the one or more tasks for the crowdworker based on the preferences of the crowdworker over the one or more requester tasks in the utility module. The presentation module is configured for recommending, at the login time to the crowdworker, the one or more tasks associated with the crowdworker selected by the task personalization module. The feedback module is configured for providing feedback on the one or more tasks recommended by the presentation module.

According to embodiments illustrated herein, there is provided a computer program product for use with a computer. The computer program product includes a computer-usable data carrier storing a computer-readable program code embodied therein for recommending one or more tasks to a crowdworker, the one or more tasks is selected from a plurality of tasks offered by a plurality of crowdsourcing platforms. The computer-readable program code includes a program instruction means for identifying one or more categories associated with the plurality of tasks offered by the plurality of crowdsourcing platforms. The computer-readable program code includes a program instruction means for identifying at the login time, values of one or more utility parameters of a plurality of requesters corresponding to the plurality of tasks. The computer-readable program code also includes a program instruction means for selecting the one or more tasks from the plurality of tasks for the crowdworker by choosing one or more constraints on the identified values of the one or more utility parameters of the plurality of requesters. The computer-readable program code further includes a program instruction means for recommending at the login time, to the crowdworker the one or more tasks associated with the crowdworker based on selecting.

BRIEF DESCRIPTION OF DRAWINGS

The accompanying drawings illustrate various embodiments of systems, methods, and various other aspects of the invention. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which:

FIG. 4 is an illustration of an interface in a system, in accordance with at least one embodiment;

FIG. 5 is an illustration of an interface in a system, in accordance with at least one embodiment.

DETAILED DESCRIPTION

Figure 1:
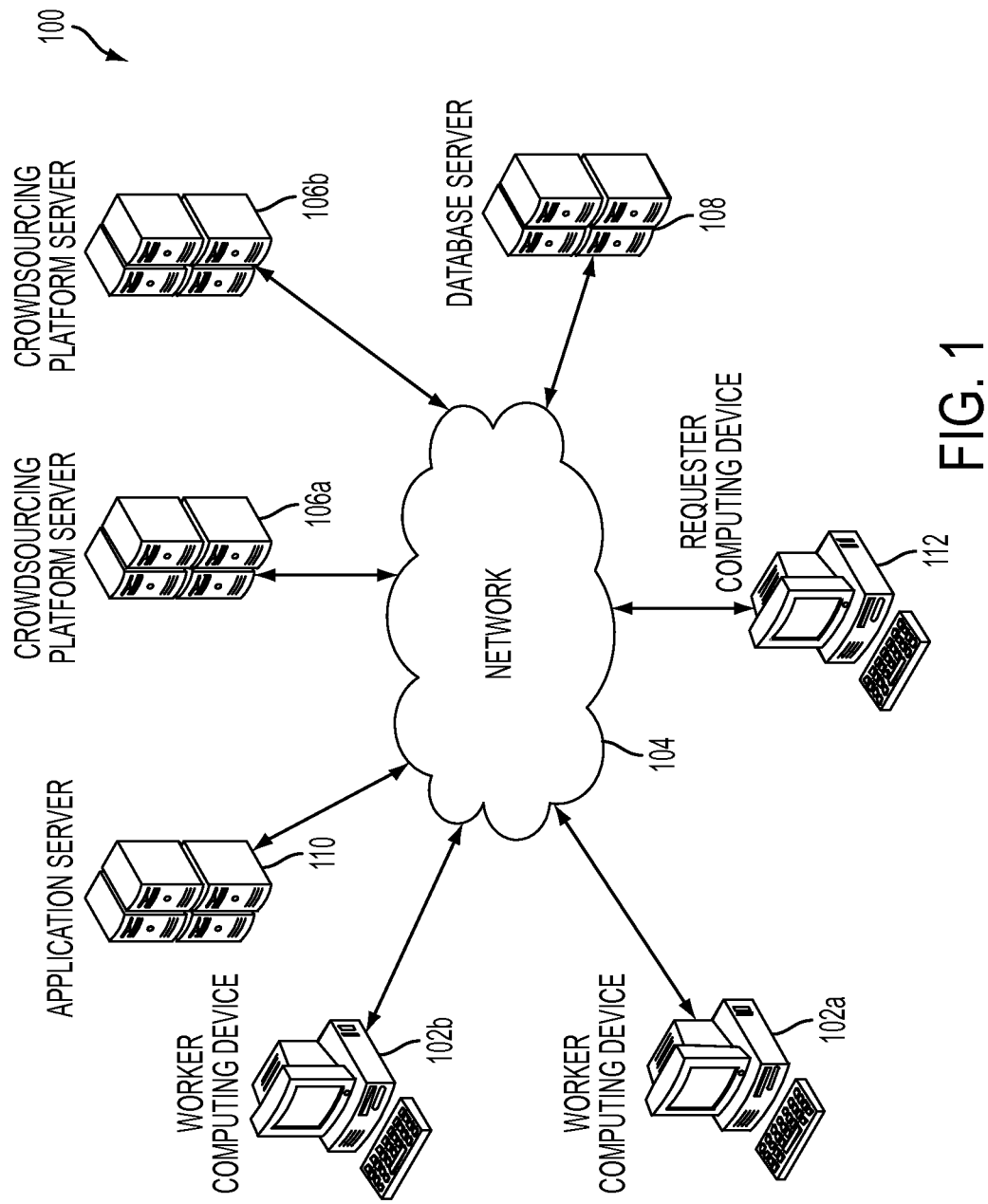
FIG. 1 is a block diagram illustrating a system environment, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

A "network" refers to a medium that interconnects various computing devices, crowdsourcing platform servers, an application server, and a database server. Examples of the network include, but are not limited to, LAN, WLAN, MAN, WAN, and the Internet. Communication over the network may be performed in accordance with various communication protocols such as Transmission Control Protocol and Internet Protocol (TCP/IP), User Datagram Protocol (UDP), and IEEE 802.11n communication protocols.

A "computing device" refers to a computer, a device including a processor/microcontroller and/or any other electronic component, or a device or a system that performs one or more operations according to one or more programming instructions. Examples of the computing device include, but are not limited to, a desktop computer, a laptop, a personal digital assistant (PDA), a tablet computer (e.g., iPad®, Samsung Galaxy Tab®) and the like. The computing device is capable of communicating with the crowdsourcing platform servers and the database server by means of the network (e.g., using wired or wireless communication capabilities).

"Crowdsourcing" refers to distributing tasks by soliciting the participation of defined groups of users. A group of users may include, for example, individuals responding to a solicitation posted on a certain website (e.g., crowdsourcing platform), such as Amazon Mechanical Turk or Crowd Flower.

"A crowdsourcing platform" refers to a business application, wherein a broad, loosely defined external group of people, community, or organization provides solutions as outputs for any specific business processes received by the application as input. In an embodiment, the business application can be hosted online on a web portal (e.g., the crowdsourcing platform servers). Various examples of the crowdsourcing platforms include, but are not limited to, Amazon Mechanical Turk or Crowd Flower.

"Crowdworkers" refer to a worker or a group of workers that may perform one or more tasks that generate data that contribute to a defined result, such as proofreading part of a digital version of an ancient text or analyzing a small quantum of a large volume of data. According to the present disclosure, the crowdsourced workforce includes, but is not limited to, a satellite centre employee, a rural BPO (Business Process Outsourcing) firm employee, a home-based employee, or an internet-based employee. Hereinafter, "crowdsourced workforce," "crowdworker," "crowd workforce," and "crowd" may be interchangeably used.

"Login time" refers to the time when the crowdworker logs into the crowdsourcing platform successfully after authentication.

"Login out time" refers to the time when the crowdworker logs out of the crowdsourcing platform successfully.

"Login session" refers to duration of an interactive activity between the crowdworker and the crowdsourcing platform server, after the login time and before the log out time of the crowdworker.

"Response session" refers to duration of an interactive activity created when the crowdworker responds to the crowdsourced tasks. In an embodiment, the response session is created when the crowdworker clicks on one of the crowdsourced tasks displayed on the crowdworker's dashboard.

"Update session" refers to duration of time in the login session of the crowdworker when the utility parameters for the crowdworker and the crowdsourced tasks are updated. In an embodiment, the update session is created when the crowdworker changes the user settings on crowdworker's dashboard or fills out a feedback form about the crowdsourced tasks displayed on the crowdworker's dashboard.

FIG. 1 is a block diagram illustrating a system environment 100 in accordance with at least one embodiment. Various embodiments of the methods and systems for recommending one or more tasks to the crowdworker are implementable in the system environment 100. The system environment 100 includes computing devices (102a, 102b; hereinafter referred to as worker computing devices 102), a network 104, crowdsourcing platform servers (106a, 106b) (hereinafter referred to as crowdsourcing platform servers 106), a database server 108, an application server 110, and a requester computing device 112 (hereinafter referred to requester computing device 112). A user of the worker computing devices 102 is hereinafter referred to as a crowdworker. A user of the requester computing device 112 is hereinafter referred to as a requester (e.g., who posts the tasks on the crowdsourcing platforms).

Although FIG. 1 shows only one type (e.g., a desktop computer) of the worker computing device 102 and requester computing device 112 for simplicity, it will be apparent to a person having ordinary skill in the art that the disclosed embodiments can be implemented for a variety of computing devices including, but not limited to, a desktop computer, a laptop, a personal digital assistant (PDA), a tablet computer (e.g., iPad®, Samsung Galaxy Tab®), and the like.

The crowdsourcing platform servers 106 are devices or computers that hosts one or more crowdsourcing platforms and are interconnected to the worker computing device 102 and the requester computing device 112 over the network 104. The crowdsourcing platforms accepts a plurality of tasks (hereinafter referred to as "crowdsourced tasks") from the requester computing device 112 and sends one or more tasks from the crowdsourced tasks to the worker computing device 102. Examples of the one or more tasks include, but are not limited to, digitization of forms, translation of a literary work, multimedia annotation, content creation and the like.

The database server 108 maintains a set of records for the requester. The database server 108 maintains a task record TR of crowdsourced tasks submitted by the requester to the crowdsourcing platform servers 106. In an embodiment, the task record TR contains information on business aspects related to the requester with respect to quality, security, and deadline requirements of the crowdsourced tasks/processes.

In another embodiment, an application/tool/framework maintains the task record TR of crowdsourced tasks submitted by the requester to the crowdsourcing platform servers 106.

The requester posts tasks on the crowdsourcing platform servers 106 for which it requests solutions from various crowdworkers. In an embodiment, the requester may access the application server 110 and submit the tasks to be crowdsourced on the application server 110. In this case, the requester accesses the application server 110 over the network 104 to submit the tasks to be crowdsourced (may be through a web based interface).

In an embodiment, the crowdsourcing platform servers 106 hosts the application/tool/framework for recommending one or more tasks to the crowdworker, where the one or more tasks are selected from the various tasks offered on the crowdsourcing platform servers 106.

In an embodiment, the application server 110 hosts the application/tool/framework for recommending one or more tasks to the crowdworker. As the application server 110 is interconnected with the requester, the crowdworker, and the crowdsourcing platform servers 106, any crowdsourced tasks received from the requester goes to the crowdworker via the crowdsourcing platform servers 106. The application on the application server 110 interacts with the crowdsourcing platform servers 106, makes recommendations on the crowdsourced tasks, and then submits the recommendations to the crowdworker.

In yet another embodiment, a client application installed on the crowdworker computing device 102 performs the functionality of recommending one or more tasks to the crowdworker.

Figure 2:
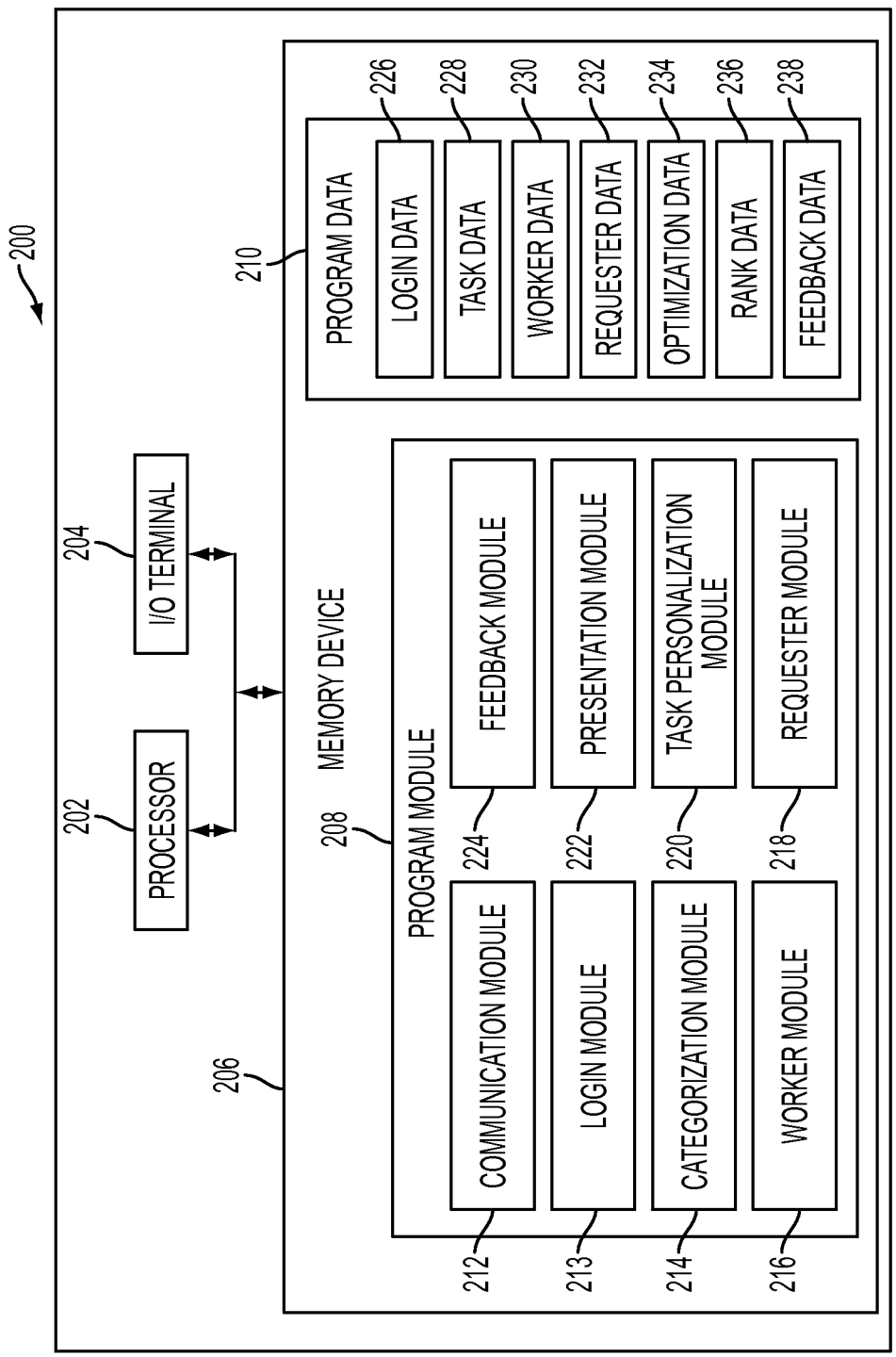
FIG. 2 is a block diagram illustrating a system, in accordance with at least one embodiment.

FIG. 2 is a block diagram illustrating a system 200 in accordance with at least one embodiment. The system 200 (hereinafter alternatively referred to as CARPE DIEM 200) may correspond to any of the crowdsourcing platform servers 106, the application server 110, or the worker computing device 102.

The system 200 includes a processor 202, an input/output (I/O) terminal 204, and a memory 206. The memory 206 includes a program module 208 and a program data 210. The program module 208 includes a communication module 212, a categorization module 214, a worker module 216, a requester module 218, a task personalization module 220, a presentation module 222, and a feedback module 224. The program data 210 includes a login data 226, a task data 228, a worker data 230, a requester data 232, an optimization data 234, a rank data 236, and a feedback data 238. In an embodiment, the memory 204 and the processor 202 may be coupled to the I/O terminal for display and/or one or more inputs.

The processor 202 executes a set of instructions stored in the memory 204 to perform one or more operations. The processor 202 can be realized through a number of processor technologies known in the art. Examples of the processor 202 include, but are not limited to, an X86 processor, a RISC processor, an ASIC processor, a CISC processor, or any other processor. In an embodiment, the processor 202 includes a Graphics Processing Unit (GPU) that executes the set of instructions to perform one or more image processing operations.

The memory 204 stores a set of instructions and data. Some of the commonly known memory implementations can be, but are not limited to, a Random Access Memory (RAM), Read Only Memory (ROM), Hard Disk Drive (HDD), and a secure digital (SD) card. The program module 208 includes a set of instructions that are executable by the processor 202 to perform specific actions such as recommending tasks to the crowdworker. It is understood by a person having ordinary skill in the art that the set of instructions in conjunction with various that hardware of the CARPE DIEM 200 enable the CARPE DIEM 200 to perform various operations. During the execution of instructions, the login data 226, the task data 228, the worker data 230, the requester data 232, the optimization data 234, the rank data 236, and the feedback data 238 may be accessed by the processor 202.

The communication module 212 receives information on the various tasks from the one or more crowdsourcing platform servers 106. In an embodiment, the communication module 212 stores the collection of these business data associated with the various tasks in the database server 108.

The categorization module 214 retrieves the information related to the crowdsourced tasks from the task record TR in the task data 228 and categorizes the crowdsourced tasks into one of K types depending on its nature. In another embodiment, the categorization module 214 retrieves the information related to the crowdsourced tasks from the task record TR in database server 108 and categorizes the crowdsourced tasks. For example, if various crowdsourced tasks are received from the requester to digitize contents or information from application forms, the categorization module 214 would then categorize the crowdsourced tasks as digitization. Once the categories are defined by the categorization module 214, the categorization module 214 then updates the task records with category names for the corresponding crowdsourced tasks.

The worker module 216 and the requester module 218 compute utility parameters for the crowdworker and the requester respectively. The utility parameters of the crowdworker may indicate the suitability of the crowdsourced tasks to meet the crowdworker's objective at the login time and the likelihood that the crowdworker will work on the given crowdsourced tasks. The utility parameters of the requester may indicate priorities on the crowdsourced tasks based on the requester's objective. Various priority settings may include criteria such as, but are not limited to, completion time, quality control, requester category, etc.

The worker module 216 retrieves the login data and the feedback data 238 for the crowdworker to measure the crowdworker's objective. Once the worker module 216 successfully authenticates the login data of the crowdworker, the worker module 216 retrieves the log record Rc of the crowdworker from the worker data 230. The log record Rc contains information on the short and long term interaction patterns of the crowdworker with the CARPE DIEM 200. The worker module 216 captures the utility of the crowdsourced tasks for the crowdworker when the crowdworker logs into the CARPE DIEM 200 at login time, based on the short-term and long-term behavioral patterns stored in the log record Rc. In addition, the worker module 216 also captures the feedback from the crowdworker for the crowdsourced tasks from the feedback data 238. The worker module 216 updates the utility of the crowdsourced tasks for the crowdworker by using a worker utility.

The worker module 216 computes the utility of the crowdsourced tasks to the crowdworker using the worker utility that includes, but are not limited to, a cost utility, an access utility, a regularity utility, a preference utility, and an effort utility. The worker utility with its mathematical expressions are explained below:

Cost utility: Cost utility is defined as a payment offered by the requester of the crowdsourced tasks.

In an embodiment, for example, the cost utility (C) (the cost or price offered for the crowdsourced tasks) for task k at time t to the set of crowdworkers i is represented as $C(i,k,t) \leq C_{max}$, where $C_{max}$ represents the maximum cost offered for the completion of the task. In an embodiment, cost utility increases with higher payments offered by the requester.

Access utility: Access utility is defined as total number of times the crowdworker or the crowdworker's contacts accessed one or more crowdsourced tasks from the total categories of the crowdsourced tasks before login time.

In an embodiment, for example, the access utility (A) is represented as $$A(i,k,t) = (1-\alpha)A_{self}(i,k,t) + \alpha A_{nw}(i,k,t), 0 \leq \alpha \leq 1,$$

where $$A_{self}(i,k,t) = \frac{1}{2^{\lambda_r(t-t_S^{\hat{k},i})}} + \sum_{n=1}^{S-1} \frac{1}{2^{\lambda_0(t-t_n^{\hat{k},i})}},$$

where S represents the total number of times crowdworker i accessed task k until t, and $A_{self}$ represents the utility of the task k to the crowdworker i generated directly by the crowdworker i, $A_{nw}$ represents the utility of the task k to the crowdworker i generated indirectly by the crowdworker i through the crowdworker's i contacts, and $t_n^{\hat{k},i}$ represents the time of the nth (n=1, 2, ..., S) access to the task k. In an embodiment, the utility of the task k increases if the crowdworker i has worked on a similar task to k recently and/or frequently. The parameters, $\lambda_r$ and $\lambda_o$, determine weights given to recent history and old history.

If $\eta(i)$ denotes the contacts of crowdworker i, the access utility (A) increases the utility of a task k that is recently/frequently accessed by the crowdworker's contacts which is represented as $$Anw(i,k,t) = \sum_{j \in \eta(i)} \left\{ \frac{1}{2^{\lambda_r(t-t_S^{\hat{k},i})}} + \sum_{n=1}^{S-1} \frac{1}{2^{\lambda_0(t-t_n^{\hat{k},i})}} \right\}.$$

In an embodiment, the access utility (A) may help personalize the recommendations to the crowdworker's task preferences without having to specify them explicitly.

Regularity utility: Regularity utility is defined as how frequent the crowdworker is and at what time of a day in working on one or more crowdsourced tasks.

In an embodiment, for example, the regularity utility (R) is represented as $$R(i,k,t) = R(i,k,r,m); \forall t \in (r,m),$$

where $R(i,k,r,m) = \delta R(i,k,r, m-1) + (1-\delta)\Delta_R(i,\hat{k},r,m); \Delta_R(i,\hat{k},r,m) = \{0,1\}; 0 \leq \delta \leq 1$, where r represents a segment on $m^{th}$ day. In an embodiment, the utility value of the task k to the crowdworker i increases based on how "regularly" the task k is being accessed by the crowdworker i and reflects the crowdworker's day-to-day behavior.

In an embodiment, for example, the crowdworker i may prefer to work on labeling tasks every morning from 7-8 AM during his bus ride to work, while participating in more complex tasks later at night 10-11 PM. By using the regularity utility (R) on the crowdworker i based on daily reference on the mth day, the mth day can be divided into several time segments r. The utility value based on regularity at rth segment on mth day is defined above, where $\Delta_R(i,\hat{k},r,m)=1$ if the task k is accessed at least once in rth time segment on mth day, and 0 otherwise. The parameter $\delta$ determines weights given to the current and old regularity measures.

Preference utility: Preference utility is defined as the type of the crowdsourced tasks the crowdworker is interested in working on.

In an embodiment, for example, the preference utility (P) is represented as $$P(i,k,t) = \theta \log p(i,\hat{k},t) + (1-\theta) \log p_{avg}(\ddot{k},t), 0 \leq \theta \leq 1$$

where $\theta$ represents the weighted average of the rating $p(i,\hat{k},t)$ for the task k provided by the crowdworker i, and $p_{avg}(\ddot{k},t)$ represents the average system-wide score of the quality of the requesters. In an embodiment, the crowdworker i may provide feedback (e.g., 1-5 ratings) for the task k that was recommended and the quality of the requesters who posted the task k. In another embodiment, for example, the requesters of crowdsourced tasks can become more competitive to the crowdworker i by offering better terms of payments offered, better task design, etc.

Effort utility: Effort utility is defined as a measure of duration of time the crowdworker spent working on the recommended one or more tasks between the start of successive login sessions.

In an embodiment, for example, the effort utility (E) is represented as $$E(i,k,t) = \beta E(i,k,tS) + (1-\beta)\Delta_A(tS,t),$$

where $$\Delta_A(tS,t) = \frac{1 - e^{-\gamma \sum_{n=1}^{D} d_n^{\hat{k},i}}}{1 - e^{-\gamma(t-t_S)}},$$

where $d_n^{\hat{k},i}$ represents the duration of nth activity, i.e., time spent by user i on task (of type) k, and D is the total number of activity periods between the last time tS the user accessed the system and current time t.

The denominator in the function $\Delta_A(tS,t)$ is used for normalization. Note that, the utility increases with shorter activity periods thereby giving a preference to types of tasks that can be solved quickly by the user in a limited span of time.

Finally, the worker utility (U) is a weighted combination of the above metrics defined as $$U(i,k,t) = \omega_1 C(i,k,t) + \omega_2 A(i,k,t) + \omega_3 R(i,k,t) + \omega_4 P(i,k,t) + \omega_5 E(i,k,t),$$

where $0 \leq U(i,k,t) \leq 1$.

The worker module 216 after computing the utility parameters of the crowdworker updates the worker data 230.

The requester module 218 retrieves the login data for the requester to measure the requester's objective. Once the requester module 218 successfully authenticates the requester based on the login data, the requester module 218 then retrieves the task record $T_R$ of the requester from the task data 228. In another embodiment, the database server 108 maintains the task record $T_R$ of crowdsourced tasks submitted by the requesters to the crowdsourcing platform servers 106.

The requester module 218 computes the utility of the crowdsourced tasks for the requester by using requester utility. The requester utility may include, but are not limited to, a differentiation utility, an influence utility, an expiry time utility, and a measure of performance utility.

In an embodiment, the requester module 218 may simultaneously compute the utility of the crowdsourced tasks to the requester as the worker module 216 computes the utility of the crowdsourced tasks to the crowdworker. The requester utility with its mathematical expressions are explained below:

Differentiation utility: Differentiation utility is defined as a measure of the preference of the crowdsourced tasks posted by the requesters that are able to meet the crowdworker's objective.

In an embodiment, for example, the differentiation utility (D) may be measured as $$\text{Revenue}(\vec{k},t) = \text{Hits}_{\vec{k},t} \times \text{UnitCost}_{\vec{k},t},$$

where $D(i,k,t) = 1/\text{Revenue}(\vec{k},t);$ $\text{Hits}_{\vec{k},t}$ represents the number of tasks k posted by the requester that were responded to by the crowdworker at time t during the response session; and $\text{UnitCost}_{\vec{k},t}$ represents the payments offered by the requester for the task k at time t.

In this case, differentiation utility (D) gives preference to the requesters who post high volumes of tasks, receive large number of requests from the crowdworkers, and/or provide higher payments for their posted tasks.

Influence utility: Influence utility is defined as a measure of the influence of the crowdworkers and their contacts who are working on the crowdsourced tasks posted by the requester.

In an embodiment, for example, the influence utility (I) may be measured as $$I(i, k, t) = \frac{1-d}{N} + d \cdot \sum_{j \in In(i)} \frac{I(j, k, t)}{|Out(j)|},$$

where In(i) are the set of crowdworkers that influenced crowdworker i and Out(i) is the set of crowdworkers that have been influenced by crowdworker I; and N is the total set of crowdworkers in the CARPE DIEM 200 and d is a control parameter which decides the influence of the crowdworker i for the task k at time t.

In this case, the crowdworker's influence increases when every time a task that crowdworker has worked on is taken up by another worker in the crowdworker's contacts. On this basis, the task utility increases when it is assigned to the crowdworker with greater influence.

Expiry Time utility: Expiry time utility is defined as a measure of the urgency with respect to the completion of crowdsourced tasks posted by the requester.

In an embodiment, for example, the expiry time utility (E) may be measured as $$E(i,k,t) = (1+\mu)^{-t(k)/j(k)},$$

where t(k) is the time to expire for task k, j(k) is the number of remaining tasks in the same category and $\mu \ll 1$.

In this case, the expiry utility (E) of selective tasks from the crowdsourced tasks increases based on the urgency with respect to the completion when there is an imminent expiry (deadline) or a large number of pending judgments on the selective tasks, thereby promoting attention of the crowdworkers to the selective tasks.

Measure of Performance utility: Measure of Performance utility is defined as a measure of the performance of the crowdworker's working on the crowdsourced tasks.

In an embodiment, for example, the Measure of Performance utility (M) may be measured as $$M(i,k,t) = \rho E(i,k,tS) + (1-\rho)\Delta_M(tS,t)$$

where $$\Delta_M(tS, t) = = \frac{1 - e^{-\gamma\left(\sum_{n=1}^{D} a_n^{\hat{k},i}\right)/n}}{1 - e^{-\gamma(a_{max}^{\hat{k}} - a_{min}^{\hat{k}})}},$$

where $\sum_{n=1}^{D} a_n^{\hat{k},i}/n$ is the average accuracy of crowdworker i on task k; and $a_{max}^{\hat{k}}$ and $a_{min}^{\hat{k}}$ are maximum and minimum accuracies for the task k.

In this case, the Measure of Performance utility (M) computes the performance factors that include, but not limited to accuracy, completion time, response time, etc., of the crowdworker with respect to the work assigned to the crowdworker. From the requester's point of view, a high Measure of Performance utility (M) for the crowdworker may indicate that the crowdworker has proven track record with respect to the work assigned to the crowdworker.

Finally, the requester utility (W) is a weighted combination of the above metrics defined as $$W(i,k,t) = \omega_6 D(i,k,t) + \omega_7 I(i,k,t) + \omega_8 E(i,k,t) + \omega_9 M(i,k,t),$$
where $0 \le W(i,k,t) \le 1$ The requester module 218 after computing the utility parameters of the requester updates the requester data 232.

The task personalization module 220 retrieves the information stored in the worker data 230 and requester data 232. The task personalization module 220 optimizes the selection of one or more tasks from the crowdsourced tasks for the crowdworker and the requester. The task personalization module 220 optimizes the selection based on the values of the utility parameters of the crowdworker and the requester and provides an optimization parameter $W_F$. In an embodiment, the optimization parameter $W_F$ with a value $\partial = 1$ corresponds to optimizing for workers only and $\partial = 0$ corresponds to optimizing for the tasks posted by the requester.

In an embodiment, the task personalization module 220 calculates the optimization parameter $W_F$ based on a linear integer program. In another embodiment, the task personalization module 220 calculates the optimization parameter $W_F$ based on a dynamic optimization program.

The linear program may be useful when given a fixed set of tasks T and crowdworkers N, how to assign a subset b of tasks to crowdworkers such that the crowdworker and the requester utilities are maximized.

In this case, the assumption is made that b tasks are to be allocated to the crowdworker i at time t. The linear integer program may be used to maximize the worker utility and the requester utility using the following expression:

$$\max \sum_{i=1}^{N} \sum_{j1=}^{T} (\partial U(i, j, t) + (1-\partial)W(i, j, t))x_{ij}$$

$$\sum_{j=1}^{T} x_{ij} \leq b \quad \forall i$$

$$\sum_{i=1}^{N} x_{ij} \leq T \quad \forall j$$

$$x_{ij} \in \{0, 1\} \quad \forall i, j$$

Here, $x_{ij}=1$ if crowdworker i has a task j, and 0 otherwise.

Furthermore, the task personalization module 220 may choose constraints to ensure that crowdworker i is not assigned with more than b tasks, and no more than T tasks are assigned to any crowdworker N. Using the sets as described above, the linear integer program chooses an allocation that maximizes the utility parameters of the crowdworkers N and the requesters T. In an embodiment, for example, the linear integer program can be solved in polynomial time using a network flow-type algorithm.

The dynamic optimization program may be used in the context of changing preferences towards crowdsourced tasks by the crowdworker. In an embodiment, for example, crowdworkers accessing the CARPE DIEM 200 can login and logout at different points throughout the day according to their convenience and the tasks can only be assigned to the crowdworker when the crowdworker logs into the CARPE DIEM 200. Hence only a subset of crowdworkers i from the set of crowdworkers N logs into the CARPE DIEM 200. The dynamic optimization program computes and maintains offline for each time period the utilities for the crowdworkers and the requesters and assigns the optimized set of tasks using utility maximization for the crowdworker only at the login time of the crowdworker.

The task personalization module 220 thus finds out the optimized set of tasks corresponding to the maximized values of the utility parameters of the crowdworkers N and the requesters T. The task personalization module 220 stores the information pertaining to the optimized set of tasks in the optimization data 234.

The task personalization module 220 further ranks the selected optimized set of tasks for the crowdworker and the requester and saves the information in the rank data 236. In an embodiment, for example, the crowdworker i has received optimized b different tasks. The task personalization module 220 chooses on how to present these optimized set of tasks to the crowdworker. In this case, the utility parameters of the crowdworker and the requester are ordered using a rank parameter β. The expression as stated earlier thus becomes βU(i,j,t)+(1−β)W(i,j,t).

If β=1 then the optimization is done only for users, and if β=0 then the optimization is done only for requesters. In an embodiment, the value of β may be set without any bias towards crowdworkers or requesters.

The task personalization module 220 thus finds out the ranked optimized set of tasks corresponding to the maximized values of the utility parameters of the crowdworkers N and the requesters T. The task personalization module 220 stores the information pertaining to the ranked optimized set of tasks in the rank data 236.

The presentation module 222 retrieves the information pertaining to the ranked optimized set of tasks stored in the rank data 236. The presentation module 222 then displays these ranked optimized set of tasks corresponding to the maximized values of the utility parameters of the crowdworkers N and the requesters T on the crowdworker's dashboard.

Figure 3A:
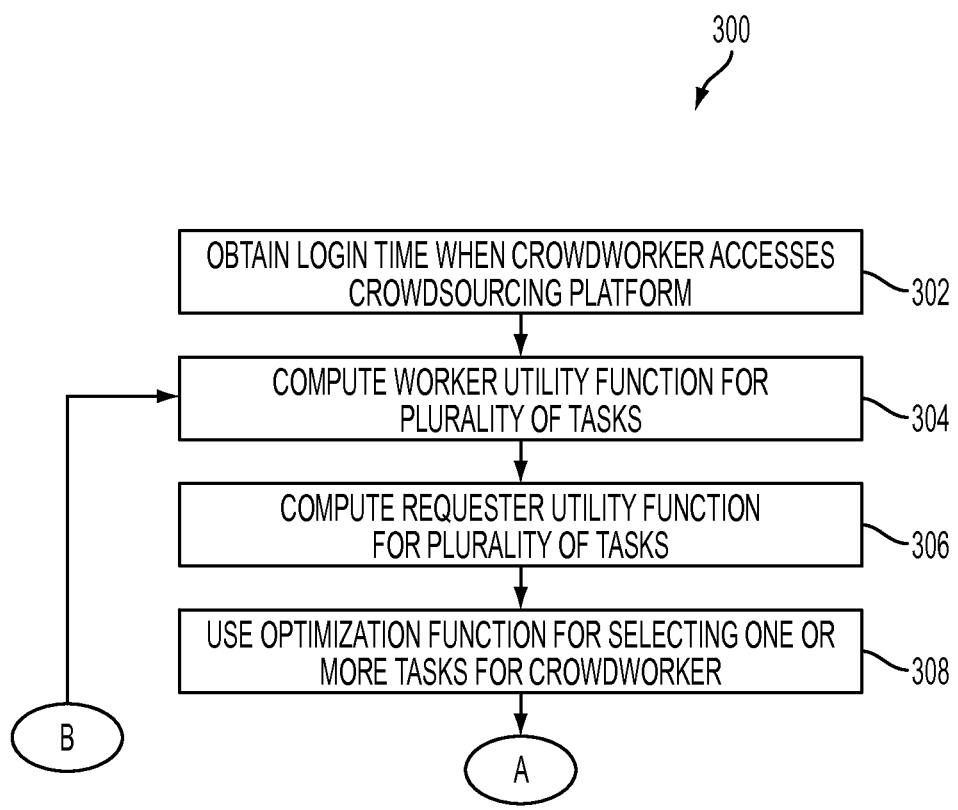
FIGS. 3A and 3B are flow diagrams illustrating a method for recommending one or more tasks to a crowdworker, in accordance with at least one embodiment.
Figure 3B:
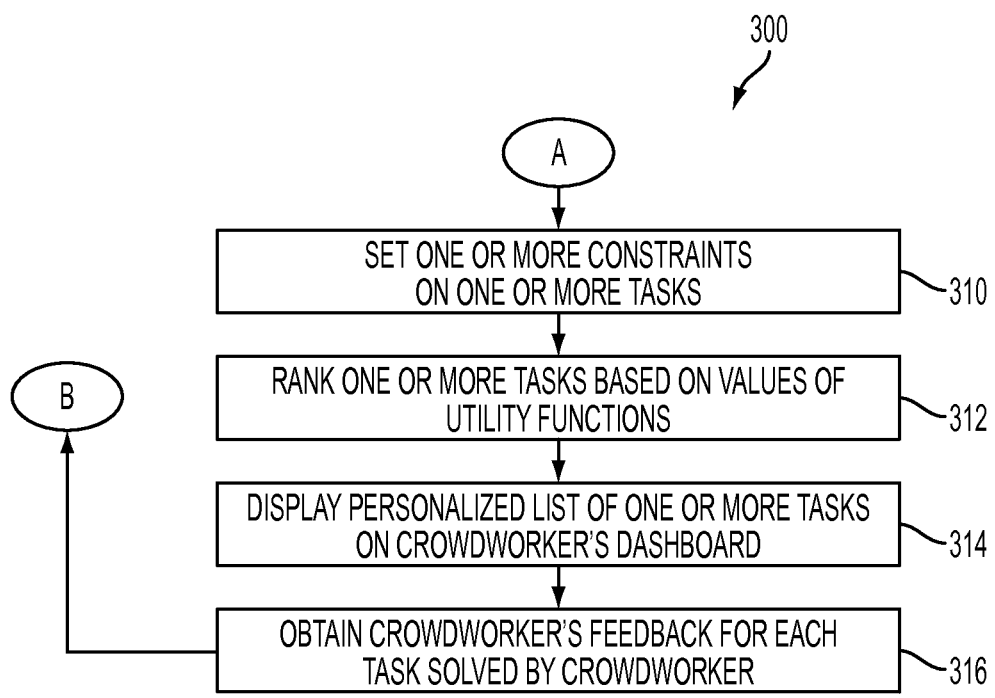

FIGS. 3A and 3B are flow diagrams 300 illustrating a method for recommending one or more tasks to the crowdworker, in accordance with at least one embodiment.

The CARPE DIEM 200 decides the ranked optimized tasks for the crowdworker from the crowdsourced tasks submitted by the requesters and recommends the ranked optimized tasks onto the crowdworker's dashboard when the crowdworker successfully logs into the CARPE DIEM 200. The CARPE DIEM 200 implements following method:

At step 302, the login module 213 obtains login time when crowdworker accesses the crowdsourcing platform servers 106. The login module 213 creates a login session for the crowdworker at the login time. The login session is terminated when the crowdworker logs out of the CARPE DIEM 200. The login module 213 further collects information related to the crowdworker at login time and stores the information in the log data of the crowdworker. In an embodiment, the information related to the crowdworker at login time may be user settings or user preferences on the web-based interface.

At step 304, the worker utility for plurality of tasks is computed. In an embodiment, the worker utility maintains information about crowdworker access history on the CARPE DIEM 200. The information may include, but not limited to which tasks are preferred by the crowdworker, at what time of the day the crowdworker would like to take up the crowdsourced tasks, etc. In addition, the worker utility also keeps track of performance related metrics related to the crowdworker. The performance related metrics may include, but not limited to accuracy in terms of the works submitted by the crowdworker, the time the crowdworker too to complete the responded tasks, etc. Also, the worker utility monitors the number of influences that the crowdworker has on another crowdworker and vice versa. After the crowdworker preferences are identified the worker utility gives values for the one or more of the parameters as stated earlier and saves the information in the worker data 230.

In another embodiment, the crowdworker influence increases by one every time a task that crowdworker has worked on is taken up by another crowdworker in his/her network.

At step 306, the requester utility for plurality of tasks is computed. In an embodiment, the requester utility identifies the preference to tasks posted by requesters based on the number of crowdworkers picking up the tasks. The requester utility gives preference to tasks from requesters who can be possibly viewed as "high-value" entities, either by historically submitting a large number of requests (Hits_($\ddot{k}$,t)) and/or higher payments (UnitCost_($\ddot{k}$,t)) for their tasks.

In addition, the requester utility increases when it is assigned to a crowdworker with greater influence of the posted task in the crowdworker network. The requester may leverage the crowdworker's influence over its networks to reach as many interested/skilled workers as possible.

Also, as each crowdsourced tasks have an expiry time or a predefined number of validations that need to be collected for the task to complete. The requester utility increases the utility of selective tasks that have an imminent expiry (deadline) or a large number of pending judgments, thereby promoting tasks that need the attention of workers.

At step 306, an optimization function is used for selecting one or more tasks for crowdworker. In an embodiment, the task personalization module 220 first uses the optimization function to calculate the utility of the crowdsourced tasks to the crowdworker.

At step 308, the task personalization module 220 sets one or more constraints on one or more crowdsourced tasks. In an embodiment, the task personalization module 220 may choose constraints such as limiting the number of tasks to be presented to the crowdworker based on performance metrics and preference attributes to ensure that the crowdsourced tasks are distributed selectively to the crowdworkers.

At step 310, the task personalization module 220 ranks one or more crowdsourced tasks based on values of worker utility and requester utility. In an embodiment, the task personalization module 220 ranks one or more crowdsourced tasks based on values of worker utility retrieved from the worker data 230. In another embodiment, the task personalization module 220 ranks one or more crowdsourced tasks based on values of requester utility retrieved from the requester data 232. In another embodiment, the task personalization module 220 ranks one or more crowdsourced tasks based on combined values of crowdworker and requester utility. In an embodiment, the values of the utility parameters of the crowdworker and the requester are automatically available on well defined API's such as JavaScript Object Notation JSON. In this case, by maintaining a simple data-structure within the task personalization module the crowdworker influence on the network and from the network can be collected.

At step 312, the presentation module 222 displays personalized list of one or more tasks on crowdworker's dashboard. In an embodiment, when the crowdworker logs into the CARPE DIEM 200, the information pertaining to the crowdworker and the requester present in the rank data 236 is displayed on the crowdworker's dashboard. In an embodiment, crowdworker's dashboard may display the network activity corresponding to the activity of crowdworker's network such as recommendations suggested by the network, the performance of the network related to tasks assigned to them, etc.

At step 312, the CARPE DIEM 200 obtains crowdworker feedback for each task solved by crowdworker. This is explained in detail for FIG. 5.

Figure 4:
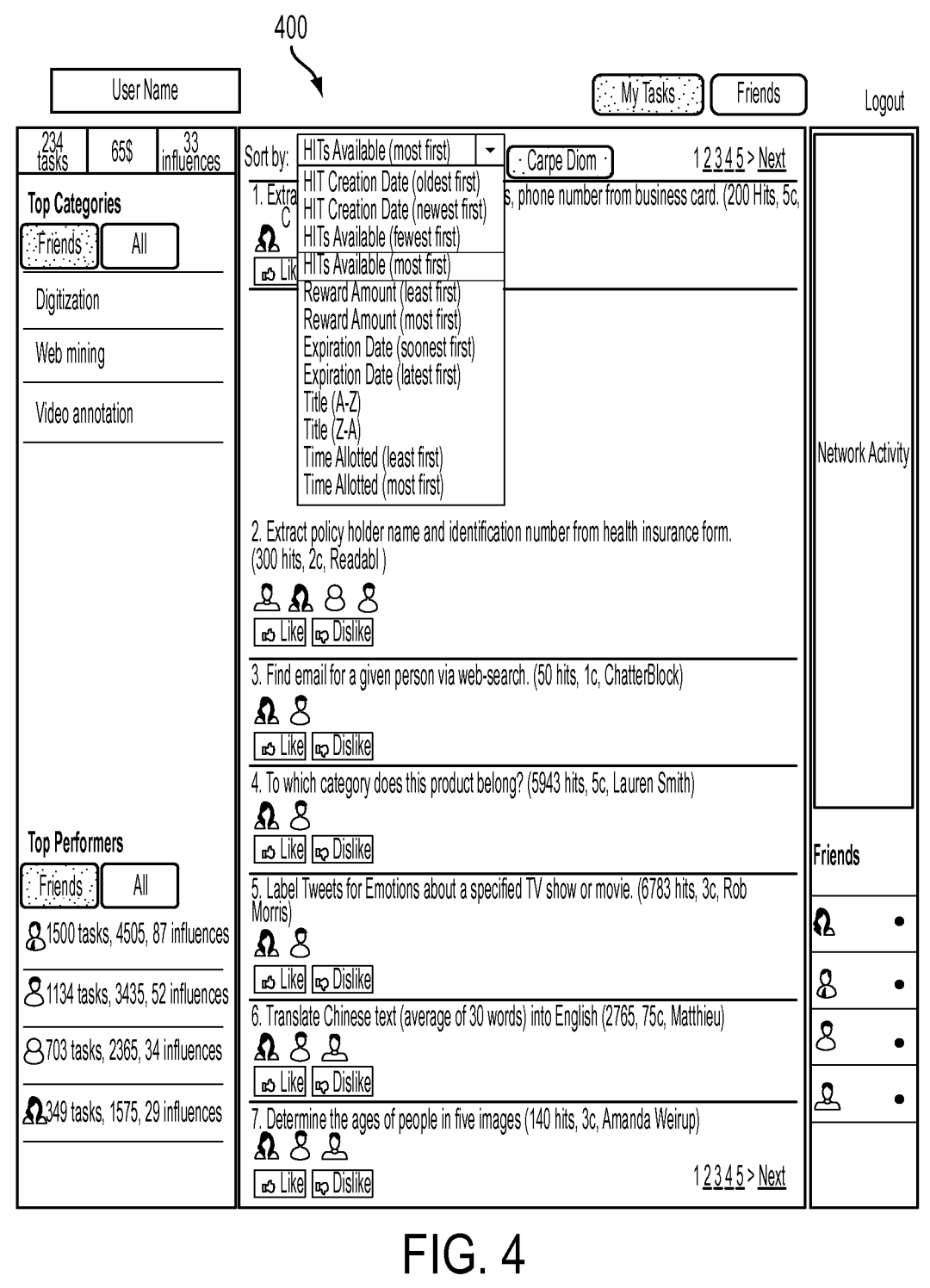

FIG. 4 illustrates a web-based interface 400 of the system 200, in accordance with at least one embodiment. Although FIG. 4 only describes a web-based interface 400 for a crowdworker to access the personalized crowdsourcing platform through the CARPE DIEM 200, it will be apparent to a person having ordinary skill in the art that the disclosed embodiments can be implemented with alternative matching types of interface found on a variety of computing devices including, but not limited to, a desktop computer, a laptop, a personal digital assistant (PDA), a tablet computer (e.g., iPad®, Samsung Galaxy Tab®), and the like. In this embodiment, the crowdworker tries to log in to the CARPE DIEM 200 by entering the login credentials on the web-based interface. Once the crowdworker is authenticated based on a successful match of login credentials with that of the login data, the crowdworker is then introduced to a dashboard. The dashboard is part of the web-based interface and displays the content associated with the CARPE DIEM 200. The contents displayed on the dashboard are logically divided into three trays. The middle tray shows the recommended list of one or more tasks for the crowdworker as per the CARPE DIEM 200 for the plurality of tasks posted on the crowdsourcing platform. The left tray shows ratings as per the CARPE DIEM 200 for the plurality of tasks posted on the crowdsourcing platform. The right tray shows connections for the crowdworker as per the CARPE DIEM 200 for the plurality of tasks posted on the crowdsourcing platform. The middle tray is further sub-divided into ratings for categories and ratings for crowdworkers. In an embodiment, the CARPE DIEM 200 establishes the crowdworker performances on the crowdworkers who have signed up or registered for CARPE DIEM 200. The top left-hand tab displays the statistics for the crowdworker in terms of the performance of the crowdworker on the responded recommended tasks during the response session. In another embodiment, the connections may correspond to the crowdworkers network of friends on a social networking platform. The top-right hand tray displays an activity stream of which crowdworker network solved which task, which requesters have been recommended by friends, as well as which crowdworker in the network influences another to respond to the task. The crowdworker may pick the task from this right tray and start working on it. As the crowdworker works on the task, the influence count of the crowdworker in the network who recommended the task increases.

FIG. 5 is an illustration of an interface 500 in the system 200, in accordance with at least one embodiment. In an embodiment, the interface 500 may be added to the web-based interface 400 of the CARPE DIEM 200. The interface 500 is provided to the crowdworker to fill in feedback related to the tasks that were offered to the crowdworker during login session. In an embodiment, for example, the crowdworker may rate the recommended tasks by strongly agreeing to it and resulting in similar or identical recommended tasks to the crowdworker. The feedback module 224 processes the information given through the interface 500 and saves it in the feedback data 238. The worker module 216 and the requester module 218 uses the feedback data 238 to update the utility of the crowdworker and the requester during the update session and will reflect in the recommended tasks that are presented the next time the crowdworker logs into the web-based interface 400.

Figure 6:
FIG. 6 is an illustration of an interface in a system, in accordance with at least one embodiment.

FIG. 6 is an illustration of an interface 600 in the system 200, in accordance with at least one embodiment. In an embodiment, the interface 600 may be added to the web-based interface 400 of the CARPE DIEM 200. The interface 600 demonstrates how a worker can initially specify some preferences etc. on the nature of crowdsourced tasks the crowdworker is interested in working on at the time of registration to the CARPE DIEM 200. In another embodiment, the crowdworker can change the preferences over time and the CARPE DIEM 200 would save the information related to the preferences in the feedback data 238. The CARPE DIEM 200 would automatically change the utility of the crowdworker during the update session as discussed for the interface 500. In this embodiment, for example, with changes in the information available for the crowdworker at the login time the recommended tasks may correspond to new categories of tasks, change in timings, etc., based on the crowdworker requirement.

The disclosed methods and systems, as illustrated in the ongoing description or any of its components, may be embodied in the form of a computer system. Typical examples of a computer system include a general-purpose computer, a programmed microprocessor, a microcontroller, a peripheral integrated circuit element, and other devices, or arrangements of devices that are capable of implementing the steps that constitute the method of the disclosure.

The computer system comprises a computer, an input device, a display unit, and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard disk drive or a removable storage drive, such as, a floppy disk drive, optical disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through an input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method of the disclosure. The method and systems described can also be implemented using only software programming or hardware or by a varying combination of the two techniques. The disclosure is independent of the programming language and the operating system used in computers. The instructions for the disclosure can be written in all programming languages including, but not limited to, 'C', 'C++', 'Visual C++', and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in various operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method, system, and computer program product, as described above, have numerous advantages. Some of these advantages may include, but are not limited to an automatic and an adaptive method to determine the utility of the crowdsourced tasks to the crowdworker based on the crowdworker's context. The methods and system helps in maximizing the utility of the crowdworker and the requester without being biased towards any. The CARPE DIEM 200 framework is easy to deploy and the user friendly interface makes it accessible to the crowdworker using a mobile computing device. Additionally, the methods and system would learn, adapt, and perform in a changing environment to dynamically changing the recommended tasks to the crowdworker based on the feedback and the changing preferences of the crowdworker.

Various embodiments of the methods and systems for recommending one or more tasks to the crowdworker have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skill in the art will appreciate that the system, modules, and sub-modules have been illustrated and explained to serve as examples and should not be considered limiting in any manner. It will be further appreciated that the variants of the above-disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and are not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-implemented method for recommending one or more tasks to a crowdworker, the one or more tasks are selected from a plurality of tasks offered by a plurality of crowdsourcing platforms, the computer-implemented method comprising:
   categorizing the plurality of tasks, offered by the plurality of crowdsourcing platforms, in one or more categories based on a type of each task in the plurality of tasks;
   determining, at a login time for each of the one or more categories, values of one or more utility parameters associated with the crowdworker, determining the values of the one or more utility parameters further comprises:
      determining an access utility value, associated with the crowdworker, for each of the one or more categories based on at least a count of tasks, in each of the one or more categories, previously attempted by the crowdworker, wherein the access utility value is included in the one or more utility parameters;
   selecting the one or more tasks from the plurality of tasks based on one or more constraints on the determined values of the one or more utility parameters of the crowdworker; and recommending, at the login time to the crowdworker, the one or more tasks associated with the crowdworker based on selecting.

2. The computer-implemented method according to claim 1, wherein the recommending corresponds to publishing the one or more tasks on a user interface of the crowdworker.

3. The computer-implemented method according to claim 1, wherein the login time corresponds to a time stamp when a login session is created for the crowdworker.

4. The computer-implemented method according to claim 1 further comprising receiving response to the one or more tasks by creating a response session.

5. The computer-implemented method according to claim 1, wherein the values of the one or more utility parameters associated with the crowdworker correspond to results of a plurality of worker-utilities.

6. The computer-implemented method according to claim 5, wherein the plurality of worker-utilities comprises at least one of a cost utility, the access utility, a regularity utility, a preference utility, and an effort utility.

7. The computer-implemented method according to claim 5, wherein the results of the plurality of worker-utilities are based on a behavioral pattern of the crowdworker, and settings of the crowdworker saved in a log record.

8. The computer-implemented method according to claim 1, wherein the values of the one or more utility parameters associated with the crowdworker correspond to at least one of accuracy, response time, and completion rate of the crowdworker.

9. The computer-implemented method according to claim 1, wherein the selecting is done at the login time using an optimization function on the values of the one or more utility parameters associated with the crowdworker.

10. A computer-implemented method for recommending one or more tasks to a crowdworker, the one or more tasks are selected from a plurality of tasks offered by a plurality of crowdsourcing platforms, the computer-implemented method comprising:
  categorizing the plurality of tasks, offered by the plurality of crowdsourcing platforms, in one or more categories based on a type of each task in the plurality of tasks;
  determining, at a login time for each of the one or more categories, values of one or more utility parameters associated with the crowdworker, determining the values of the one or more utility parameters further comprises:
    determining an access utility value, associated with the crowdworker, for each of the one or more categories based on at least a count of tasks, in each of the one or more categories, previously attempted by the crowdworker, wherein the access utility value is included in the one or more utility parameters;
    identifying, at the login time, the values of the one or more utility parameters associated with a plurality of requesters corresponding to the plurality of tasks;
    selecting the one or more tasks from the plurality of tasks based on one or more constraints on a combination of values of the one or more utility parameters associated with the crowdworker and the one or more utility parameters associated with the plurality of requesters; and
    recommending, at the login time to the crowdworker, the one or more tasks associated with the crowdworker based on selecting.

11. The computer-implemented method according to claim 10 further comprising updating during an update session a log record containing the combined values of the one or more utility parameters of the crowdworker and the plurality of requesters.

12. The computer-implemented method according to claim 10, wherein the values of the one or more utility parameters associated with the plurality of requesters corresponds to results of a plurality of requester-utilities.

13. The computer-implemented method according to claim 12, wherein the plurality of requester-utilities comprises at least one of a differentiation utility, an influence utility, an expiry time utility, and a measure of performance utility.

14. The computer-implemented method according to claim 10, wherein the selecting is done at the login time using an optimization function on the combined values of the one or more utility parameters of the crowdworker and the plurality of requesters.

15. A system for recommending one or more tasks to a crowdworker, the one or more tasks are selected from a plurality of tasks offered by a plurality of crowdsourcing platforms, the system comprising:
  one or more processors configured to:
    determine preferences of a crowdworker at a login time based on values of one or more utility parameters associated with the crowdworker on the plurality of tasks, determining the values of the one or more utility parameters further comprises:
      determine an access utility value, associated with the crowdworker, for each of the one or more categories based on at least a count of tasks, in each of the one or more categories, previously attempted by the crowdworker, wherein the access utility value is included in the one or more utility parameters;
    determine one or more requester tasks based on the values of the one or more utility parameters associated with the plurality of requesters at the login time;
    select the one or more tasks, from the plurality of tasks, for the crowdworker based on the preferences of the crowdworker over the one or more requester tasks;
    recommend, at the login time to the crowdworker, the one or more tasks associated with the crowdworker based on the selection; and
    receive feedback from the crowdworker on the one or more tasks.

16. The system according to claim 15, wherein the one or more processors are further configured to compute the values of the one or more utility parameters of the crowdworker based on a behavioral pattern and settings of the crowdworker saved in a log record.

17. The system according to claim 16, wherein the one or more processors are further configured to compute the values of the one or more utility parameters of the plurality of requesters on the plurality of tasks at the login time.

18. The system according to claim 16 further comprising an input/output terminal configured to:
  receive the plurality of tasks from a computing device; and
  forward the one or more tasks from the plurality of tasks to the crowdworker.

19. A non-transitory computer program product for use with a computer, the non-transitory computer program product comprising a computer-usable medium storing a computer-readable program code for recommending one or more tasks to a crowdworker, the one or more tasks are selected from a plurality of tasks offered by a plurality of crowdsourcing platforms, the computer-readable program code is executable by one or more processors in the computer to:

categorize the plurality of tasks, offered by the plurality of crowdsourcing platforms, in one or more categories based on a type of each task in the plurality of tasks;

identify at the login time, values of one or more utility parameters associated with a plurality of requesters corresponding to the plurality of tasks;

determine, at a login time for each of the one or more categories, the values of the one or more utility parameters associated with the crowdworker, determining the values of the one or more utility parameters further comprises:

determine an access utility value, associated with the crowdworker, for each of the one or more categories based on at least a count of tasks, in each of the one or more categories, previously attempted by the crowdworker, wherein the access utility value is included in the one or more utility parameters;

select the one or more tasks from the plurality of tasks for the crowdworker based on a combination of the values of the one or more utility parameters associated with the crowdworker and the one or more utility parameters associated with the plurality of requesters; and push, at the login time, to the crowdworker the one or more tasks associated with the crowdworker based on the selection.

* * * * *